P. F. KAHLER.
PHOTOGRAPH PRINTING FRAME.
APPLICATION FILED JULY 24, 1916.
1,264,524.
Patented Apr. 30, 1918.
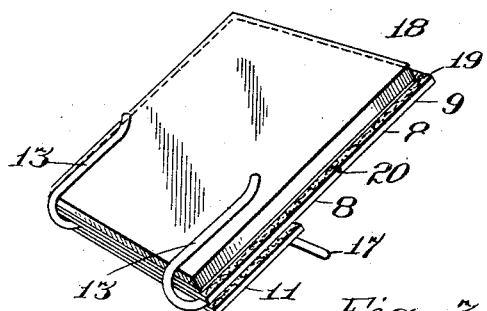
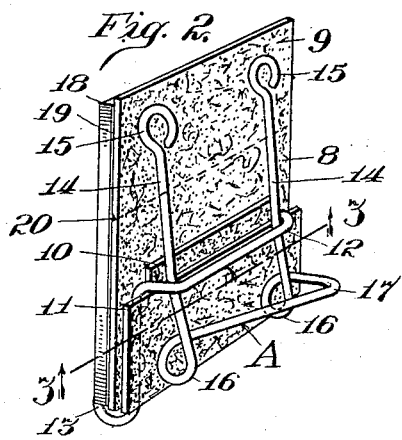
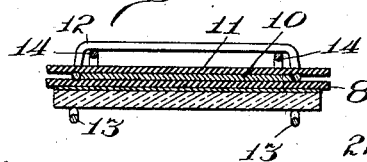
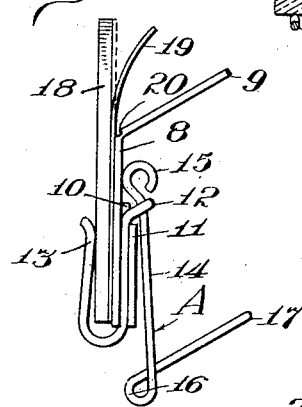
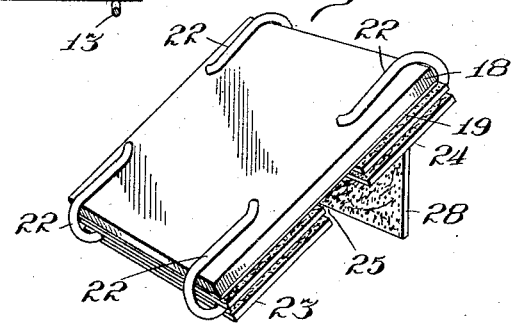
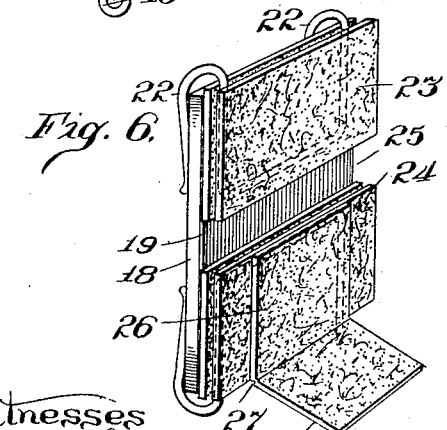
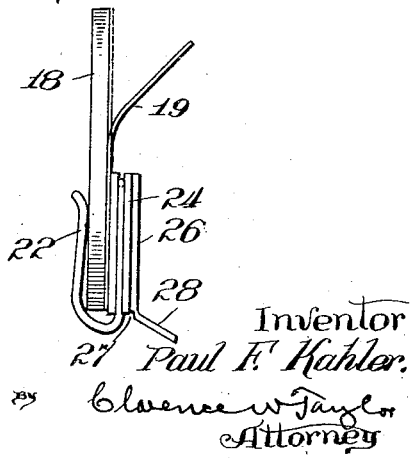
Witnesses
Milton Lenoir
L. B. Graham
Inventor
Paul F. Kahler
Clarence W Taylor
Attorney

UNITED STATES PATENT OFFICE.

PAUL F. KAHLER, OF CHICAGO, ILLINOIS.

PHOTOGRAPH-PRINTING FRAME.

1,264,524.  Specification of Letters Patent.  Patented Apr. 30, 1918.

Application filed July 24, 1916. Serial No. 110,836.

*To all whom it may concern:*

Be it known that I, PAUL F. KAHLER, a citizen of the United States of America, residing at Chicago, in the county of Cook and State of Illinois, have invented certain new and useful Improvements in Photograph-Printing Frames, of which the following is a specification.

My invention relates to improvements in photograph-printing frames, and the principal objects of my improvement are, first, to provide a simple and inexpensive device whereby a piece of sensitized paper may be properly held in close contact with a negative and examined at any time during the exposure period to light for the purpose of printing on such paper; second, to afford apparatus of the class suitable for the use of children; third, to produce an easel like structure adapted to stand at about 60 degrees for morning and evening exposures and by reversing the position of the frame adapted to stand at an angle of from 30 to 40 degrees for midday exposures when sunlight is employed; fourth, to produce a construction suitable for small negatives, and of various dimensions; and, fifth, the provision of a printing frame for film negatives to be used with a blank glass to hold the film negative flat.

With the foregoing and other objects in view, my invention consists in the novel features and in the novel combination and arrangement of the parts hereinafter fully described, illustrated in the accompanying drawings forming a part of this specification, and particularly pointed out in the claims hereunto appended, it being understood that changes, variations and modifications in the details of the invention within the scope of the claims, may be resorted to without departing from the spirit or sacrificing any of the advantages thereof.

In the drawings, Figure 1 is a perspective view of the assembled parts.

Fig. 2 is a perspective view of the back and side of the complete device.

Fig. 3 is a cross sectional view on line 3—3 on Fig. 2.

Fig. 4 is a side view with the parts in position to examine the sensitized paper.

Fig. 5 is a perspective view of a modified form of my invention.

Fig. 6 is a perspective view of the modified form.

Fig. 7 is an elevational view of one side of the modified form with the parts in position to examine the sensitized paper.

Similar letters and numerals refer to similar parts throughout the several views.

In the embodiment chosen to illustrate my present invention, 8 designates a base preferably consisting of fiber having a degree of flexibility with the end 9 free, the opposite end having a reinforcing strip 10, secured to the rear face of the part 8 by a suitable adhesive substance. A second strip 11 is adhesively secured to the strip 10 and in length is co-extensive with the width of the base 8, and of a width equal to the distance from the part 12 between the clips 13, 13, to the end of the base 8.

The easel member A is formed of a single length of wire preferably possessing resilience having parallel arms 14, 14, with rounded free ends 15, 15, loops 16, 16, and an intermediate V-shaped portion 17 disposed at a suitable angle relative to the arms 14, 14, to support the assembled frame at about 60 degrees when one end of the base is down and at from 30 to 40 degrees when the other or opposite end of the base 8 is down.

In the views shown it will be noted the negative 18 is of glass, but I do not limit my invention to the use of this particular character of negative, the usual film negative being employed by associating the sensitized paper, the film negative and a blank glass to hold the film negative flat. The sensitized paper or material (see Fig. 3) 19 is between the negative 18 and the base 8. Preferably the base is perforated transversely at 20, to facilitate moving away or turning backward the upper part 9 of the base 8 for examination of the sensitized paper to determine the progress of the printing operation.

In Figs. 5, 6 and 7, there is disclosed a modified form of my invention, the easel member A is omitted and simple clips 22 employed at both ends of the negative 18. Instead of the base 8 there is provided what is termed back portions 23, 24, with an intervening space 25, therebetween, when they are in position on the negative, either one of which at a time may be removed to ascertain progress in printing. The substitute easel member 26 is secured by suitable adhesive material to the back portion 24, and a perforated line 27 formed to facilitate flexing the supporting portion 28 to give the desired angle to the printing frame. The back portions 23, 24 and the clips 22 are suitably fixed together.

On reference to the drawings and the foregoing description, owing to the simple character of the invention, the construction and operation of the invention will be readily understood.

Having thus fully described my invention, what I claim as new, and desire to secure by Letters Patent, is

1. In a photograph-printing frame, the combination of a base, a length of wire, a plurality of clips formed at the ends of the length of wire, means to secure the clips to the base, and an easel member having parallel arms and a supporting portion at an angle to the parallel arms in wedging relation intermediate the ends of the clips.

2. In a photograph-printing frame, in combination, a base, a length of wire, a plurality of clips formed at the ends of the length of wire and carried by the base, means to secure the clips to the base, and an easel member having parallel arms with rounded free ends rearwardly positioned bearing loops and a supporting portion at an angle to the parallel arms in wedging relation thereto intermediate the clips.

3. In a photograph-printing frame, in combination, a base having a transverse perforated line intermediate its ends, a length of wire, a plurality of clips formed of the ends of the length of wire and carried by the base, means to secure the clips to the base, and an easel member having parallel arms with their free ends bearing upon the base, rearwardly positioned bearing loops and a supporting portion at an angle to the arms in wedging relation thereto intermediate the clips.

4. In a photograph-printing frame, in combination, a base comprising a movable portion and a fixed portion the latter having a length of wire and a plurality of clips formed of the ends of the length of wire, means to secure said clips to the fixed portion of the base, and an easel member having parallel arms with their free ends bearing upon the movable part thereof and rearwardly positioned bearing loops and a supporting portion formed at an angle to the arms and in wedging relation thereto intermediate the clips.

In testimony whereof I affix my signature in the presence of a witness.

PAUL F. KAHLER.

Witness:
  SCOTT M. HOGAN.

Copies of this patent may be obtained for five cents each, by addressing the "Commissioner of Patents, Washington, D. C."